United States Patent [19]
Lai et al.

[11] Patent Number: 5,706,429
[45] Date of Patent: Jan. 6, 1998

[54] TRANSACTION PROCESSING SYSTEM AND METHOD

[75] Inventors: Robert Shiwen Lai, San Jose, Calif.; Robert Daniel Millar, Fareham, England; Harry Otto Radke, San Jose, Calif.

[73] Assignee: International Business Machines Corporation, Armonk, N.Y.

[21] Appl. No.: 210,977

[22] Filed: Mar. 21, 1994

[51] Int. Cl.[6] .................................................. G06F 13/00
[52] U.S. Cl. .......................... 395/200.01; 395/200.03; 395/500
[58] Field of Search ........................ 395/200, 200.09, 395/200.01, 200.03, 800, 500

[56] References Cited

U.S. PATENT DOCUMENTS

| | | | |
|---|---|---|---|
| 4,604,686 | 8/1986 | Reiter et al. | 395/500 |
| 4,922,486 | 5/1990 | Lidinsky et al. | 370/60 |
| 5,021,949 | 6/1991 | Morten et al. | 395/200.09 |
| 5,109,515 | 4/1992 | Laggis et al. | 395/650 |
| 5,224,098 | 6/1993 | Bird et al. | 370/94.1 |
| 5,329,619 | 7/1994 | Page et al. | 395/200.01 |
| 5,363,121 | 11/1994 | Freund | 395/600 |
| 5,425,028 | 6/1995 | Britton et al. | 370/94.1 |
| 5,428,771 | 6/1995 | Daniels et al. | 395/575 |
| 5,537,626 | 7/1996 | Kraslavsky et al. | 395/828 |

OTHER PUBLICATIONS

Per Gunningberg, Mats Bjorkman, Erik Nordmark, Stephen Pink, Peter Sjodin, Jan-Erik Stromquist, "Application Protocols and Performance Benchmarks", in *IEEE Communications Magazine*, Jun. 1989, 30-36.

V. S. Sunderam, "A Fast Transaction Oriented Protocol for Distributed Applications", Proceedings of USENIX Winter Conference, Feb. 9-12, 1988, Dallas, Texas, pp. 79-87.

*Primary Examiner*—Mehmet B. Geckil
*Attorney, Agent, or Firm*—Baker, Maxham, Jester & Meador

[57] ABSTRACT

A transaction processing system, adapted for use in a computer system having a host computer running applications and user terminals connected to the host computer, determines the transaction attributes for each transaction received by the host computer and dynamically associates a transaction protocol to be used in processing that particular transaction. The transaction protocol specifies such attributes as synchronization paradigm and flow control. The synchronization paradigm and flow control are used only for as long as the transaction remains in the system and are used only for that transaction.

21 Claims, 11 Drawing Sheets

| LENGTH | SERVER NAME | ORIGINATOR'S TOKEN | DESTINATION TOKEN |
|---|---|---|---|

*FIG. 8*

| LENGTH | APPLICATION DATA . . . |

TRANSACTION PROCESSING SYSTEM AND METHOD

BACKGROUND OF THE INVENTION

1. Field of the Invention

This invention relates generally to computer processing systems and, more particularly, to systems for processing user input transactions that are directed to applications.

2. Description of the Related Art

A computer processing system typically comprises a host computer or central processor, memory units, and one or more user terminals connected to the host computer. Application programs execute within the host computer and typically manipulate data stored in the memory units. User terminals, also referred to simply as users, generate input messages. These messages can request transactions that are processed by the application programs. Messages that request transactions also are referred to simply as transactions. Generally, the host computer supports a transaction processing system having a transaction manager that controls the execution of transactions and the processing of the application programs. An application response to a transaction is called a transaction output and also is routed by the transaction manager. The transaction output typically is returned in a message directed to the user terminal that first requested the transaction.

Users can communicate with the application programs and manipulate data stored in the memory units. The users, for example, can insert, modify, and retrieve data from the memory units through the application programs. Each one of the users can be linked directly to the host computer and identified by a connection port or node. Alternatively, each user may be connected to other users as part of a network, which in turn is connected to the host computer. Most computer systems do not permit a user terminal to communicate with the application programs until the user is linked to the host by establishing a user-host communication session via a log-in procedure.

The log-in procedure establishes the attributes of message handling, also referred to as the communication protocol, that will be followed by the host computer for the receiving of transactions from the users and for the return of transaction responses to the users. The protocol, for example, specifies a synchronization paradigm such as queued or two-phase commit, flow control parameters such as half duplex or full duplex mode, message routing to and from applications, commit sequences, and message acknowledgement schemes, and also parameters such as message word size and error detection and correction.

Generally, a user is bound to the established communication protocol for the duration of the session. Session binding of the communication protocol takes place via control blocks that are created at the beginning of each session. The information management system or supporting operating system maintains control blocks for each user connection to the computer system as transactions are received and responses are returned. After the transaction manager receives a transaction, the transaction manager determines the transaction message information within the message requesting the transaction, such as the application for which the transaction is intended and the type of data operation requested. The transaction response is returned according to the session information.

It would be advantageous if user terminals were not bound to a particular transaction processing protocol for an entire operating session. That is, if user terminals could specify different processing for different transactions, they would be able to select the best processing parameters and associated processing data structures depending on the message type, resource availability, or other dynamically encountered system condition known to them. For example, users might want to change the synchronization paradigm or transaction message routing within a communications session. Most existing systems do not permit such flexibility.

Another problem encountered by information management system users is that different users may have different communication or transaction protocols. For example, different models of terminals from different manufacturers might each have a different protocol, and therefore the host computer and information management system must accommodate a variety of communication protocols. Moreover, the networks in which the terminals might be connected could have different protocols. Again, the host computer system must support whatever communication protocol is being used by the attached network to receive messages from users, perform the necessary processing of messages to determine the type of transaction protocol the information management system uses internally, and then convert the transaction response back into the communication protocol of the user for return.

FIG. 1, for example, shows a computer processing system 10 including a host computer 12 to which multiple user terminals 14 are connected. The host computer can comprise a processor such as an International Business Machines (IBM) Corporation System/370 or 3090 with an IBM Corporation operating system called "MVS". The user terminals are used to communicate with multiple applications 16 running on the processor. As illustrated, the terminals are connected to the computer system via a connection processor 18 that, for an IBM Corporation System/370 or 3090, is known as a Virtual Telecommunication Access Method, or "VTAM". The connection processor establishes a communication session with each user terminal such that the terminal communication protocol will be recognized and transaction output will be properly directed. Each session is associated with control blocks that exist for the duration of the session and specify the protocol to be followed.

Communication between the connection processor 18 and the applications 16 occurs through an information management system 20 that operates under control of a transaction manager 22. The information management system can comprise, for example, the IBM Corporation product known as "IMS". The information management system includes multiple protocol interface modules (in the IBM Corporation IMS product, these modules are referred to as device dependent modules, or "DDM"s) 24 that receive transactions from one of the user terminals through the connection processor, recognize the communication protocol being used by the terminal, and process the transaction so as to provide a transaction protocol that can be understood by the information management system. The "DDM" through which a user terminal will communicate is established for the duration of the communication session.

The user terminals 14 can potentially use any one of many communication protocols. For example, the terminals may communicate using an IBM Corporation protocol known as a "SNA" protocol. Other protocols that might be used include APPC, TCP/IP, and RPC. A different protocol interface module "(DDM)" must be provided for each type of communication protocol that will be supported by the host computer 12. For each supported protocol, the connection processor 18 must recognize the protocol being used by the user terminal and direct the transaction to the appropriate "DDM" module. The "DDM" module can then isolate the transaction information and provide the proper transaction protocol to the information management system. "DDM" modules are generally half-duplex processes that operate serially. That is, they send a first transaction and must receive back an acknowledgment before they will transmit a second transaction. Because the half duplex "DDM" modules frequently must communicate with full duplex user terminals and complex communication protocols, the "DDM" modules can be quite complicated and difficult to create.

As can be seen from the discussion above, many different layers of processing are needed to facilitate communication from users to application programs. Transaction processing systems such as described above are often characterized in terms of an industry standard, seven-layer architectural model proposed by the International Standards Organization (ISO) and referred to as the Open Systems Interconnection (OSI) reference model. As known to those skilled in the art, the OSI model includes a lower-most physical layer at the terminal level concerned with transmitting data bits between systems over a channel, a data link layer concerned with error-free transmission of data bits, a network layer concerned with routing message packets over a host network, a transport layer whose function it is to control the flow of messages and identify message sources and destinations, a session layer concerned with establishing user transmission sessions and with message sequencing and synchronization, a presentation layer concerned with the syntax and semantics of the transmitted messages, and an application layer concerned with the application programs and getting meaningful information into and out of them.

For example, with respect to the IBM Corporation "IMS" product described above, "IMS" resides in the upper three layers of the OSI model, so that the application programs, transaction manager, and "DDM" modules comprise the application, presentation, and session layers, respectively. The "VTAM" interface modules, network channels, and user terminals comprise the lower four layers of the OSI model, including the transport layer, network layer, data link layer, and physical layer.

At the higher OSI model levels, such as the presentation layer and application layer, there are a limited number of computer system architectures in widespread use today, the "IMS" product being one of them. The number of such architectures is likely to remain relatively stable, considering the enormous amount of resources that already have been invested in building and maintaining systems based around such architectures. Many computer system users would like to keep their databases and application programs according to the presently used presentation and application layer facilities. In contrast, the lower OSI model levels, such as the transport layer and network layer, are experiencing tremendous change. For example, many network and transport protocols such as TCP/IP, APPC, and the like, were developed much later than system architectures such as the "IMS" architecture. As a result, many of the existing information management systems do not have interface modules that are compatible with the newer network and transport layer facilities.

To permit newer network protocols to interface with existing presentation and application layer facilities, interface modules must be developed that accept the newer network protocols and convert them to an appropriate transaction protocol. In many cases, it can be relatively difficult to develop new interface modules, such as "DDM" modules, that can directly bridge the protocol gap between older system architectures and newer communication protocols. Moreover, some of the newer protocols are capable of performance that cannot be supported by older systems. It would be advantageous if a transaction processing system could interface application programs to user terminals that operate according to newer protocols so that full advantage can be taken of the performance of newer user terminals and could provide an interface such that operation with newer protocols would appear seamless to existing application programs.

From the discussion above, it should be apparent that there is a need for a system that permits dynamic processing of transactions from a variety of protocols and accommodates new and modified protocols without great difficulty. The present invention satisfies this need.

SUMMARY OF THE INVENTION

In accordance with the invention, a transaction processing system, adapted for use in a computer system having a host computer running applications and user terminals connected to the host computer, determines the transaction attributes for each transaction received by the host computer and dynamically associates a transaction protocol to be used in processing that particular transaction. The transaction protocol specifies such attributes as synchronization paradigm and flow control. The synchronization paradigm and flow control are used only for as long as the transaction remains in the system and are used only for that transaction. In this way, a user can dynamically specify how each transaction will be processed independently of the manner in which other transactions are processed. The system treats transactions as objects to facilitate a separate transaction-specific, application and session independent layer in a communications architectural model. Thus, users are provided with greater flexibility in their transaction processing and transaction processing systems can more easily accommodate new protocols and new processing features desired by users To provide support for the dynamic processing of transactions, the transaction processing system creates transaction processes that implement the specified transaction protocol, including synchronization paradigm and flow control. The transaction processes are deleted from the host computer when the transaction response is generated and sent to the user terminal. In yet another aspect of the system, a high speed interprocess transport mechanism is used that can operate in full duplex mode, thereby reducing the amount of time necessary for sending and receiving transactions and increasing the number and type of user terminals that can be easily supported by the system.

Other features and advantages of the present invention should be apparent from the following description of the preferred embodiment, which illustrates, by way of example, the principles of the invention.

BRIEF DESCRIPTION OF THE DRAWINGS

FIG. 8 is a representation of the state data for command messages of the transaction protocol used by the transaction processing system illustrated in FIG. 2.

FIG. 11 is a representation of the application data of the transaction protocol used by the transaction processing system illustrated in FIG. 2.

DESCRIPTION OF THE PREFERRED EMBODIMENT

Figure 1:
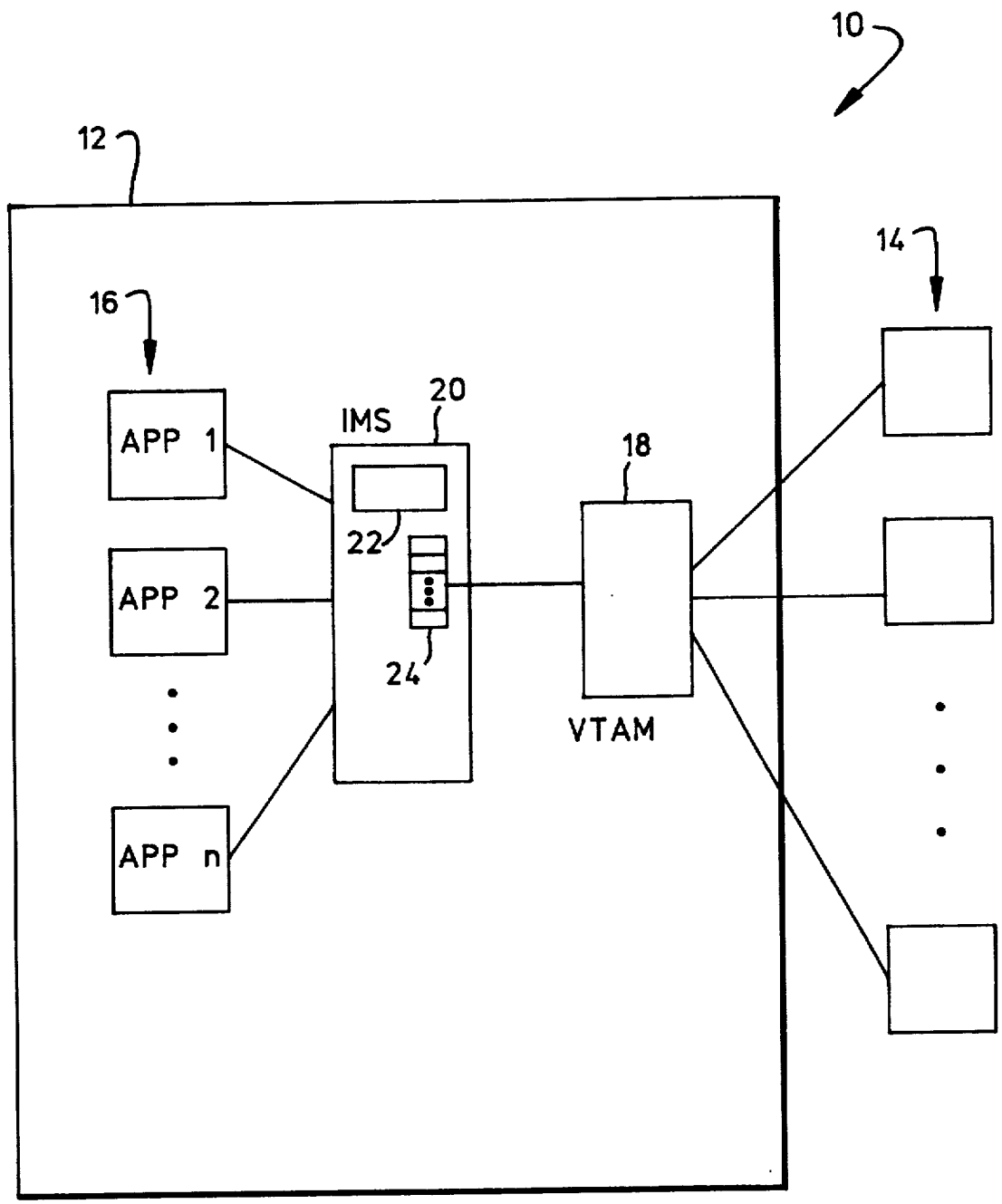
FIG. 1 is a block diagram of a prior art transaction processing system.
Figure 2:
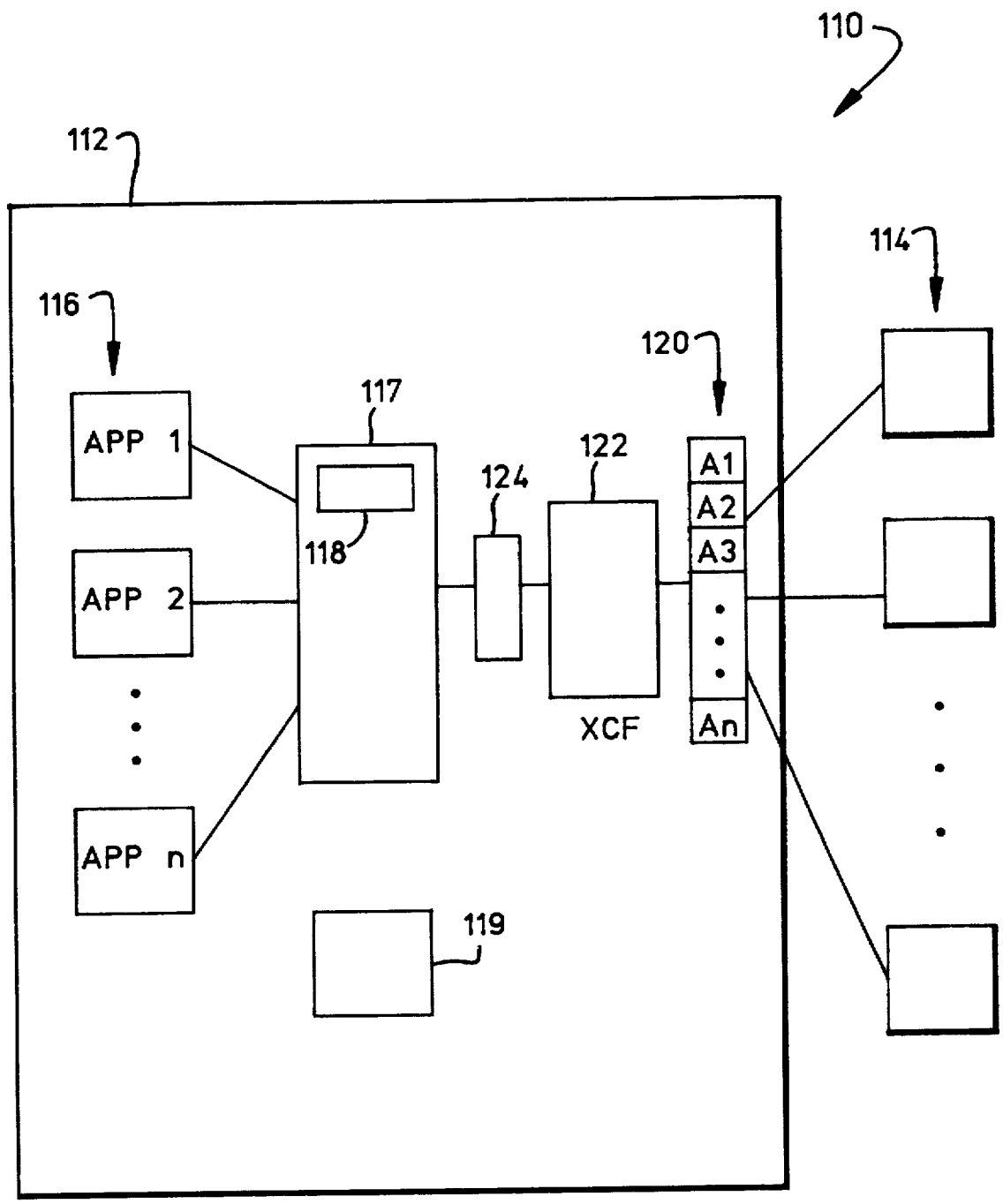
FIG. 2 is a block diagram of a computer transaction processing system constructed in accordance with the present invention.

FIG. 2 is a block diagram that shows a computer processing system 110 constructed in accordance with the present invention. The computer processing system includes a host computer 112 that can comprise, for example, a processor such as an IBM Corporation System/370 or 3090 processor running an operating system such as the IBM Corporation "MVS" product. Multiple user terminals 114 are connected to the host computer and communicate with one or more applications 116 by sending transactions through an information management system 117 running on the host computer under control of a transaction manager 118. The applications may, in turn, manipulate data stored in memory units 119 of the computer system 110. In the preferred embodiment, the computer system supports a transaction processing system that permits user terminals to dynamically specify the transaction processing attributes that will be used for each particular transaction they send. As illustrated, the user terminals communicate with the information management system through multiple adapters 120, an interprocess transport mechanism 122, and an open transaction manager 124. The user terminals send their transactions to the adapter appropriate for the communication protocol they are using. For each transaction that is received, the adapters recognize the communication protocol being used by the terminal and provide a transaction protocol that can be understood by the information management system. Adapters can specify a synchronization paradigm and can control the flow of transactions through the information management system by providing transaction message information that will result in the desired synchronization and flow control. Thus, user terminals 114 can change the processing of transactions dynamically with each transaction according to their needs. In addition, new adapters can be created for accommodating new protocols without adding to the size or complexity of the information management system.

The transaction processing system constructed in accordance with the present invention is based on a client/server model such that the open transaction manager 124 can be viewed as a server and the adapters 120 can be viewed as client processes. In that regard, the adapters are only one type of client process that can be served by the open transaction manager. The processes can take whatever form necessary for implementation of the processes described in greater detail below in conjunction with the present invention, as determined by those skilled in the art. In this way, the present invention provides a system that, in terms of a communications architectural model, provides a layer separating the processing requirements of transactions from the communication management requirements of users, or client processes.

An additional benefit provided by the computer processing system 110 illustrated in FIG. 2 is that both the adapters 120 and the interprocess transport mechanism 122 are capable of communicating in a full duplex mode. Thus, the full communication speed of user terminals 114 can be exploited for faster handling of transactions. The interprocess transport mechanism supports the transport of transactions to the applications and transaction responses back to the adapters by maintaining appropriate data structures. In the preferred embodiment, the information management system comprises the IBM Corporation product called "IMS", but those skilled in the art will recognize that the teachings of the present invention apply equally to other computer systems and other information management products. If the computer system comprises a processor such as an IBM Corporation System/370 or 3090 processor running the IBM Corporation "MVS" operating system, then the interprocess transport mechanism can comprise, for example, an IBM Corporation process product known as the Cross-System Coupling Facility, or "XCF". Using this existing product simplifies the implementation of the invention into computer systems.

When the interprocess transport mechanism 122 receives a user transaction, the mechanism sends the transaction on to the open transaction manager 124, which acts as an interface between the mechanism and the information management system 117. The open transaction manager determines the appropriate pathway for a transaction into and out of the information management system based on parameters specified by the user 114 in the transaction message information, as described further below. That is, the open transaction manager 124 specifies the data structures that are necessary to pass a transaction from the interprocess transport mechanism 122 to the information management system 117 and pass a transaction response from the information management system back to the appropriate user terminal 114.

Thus, the information management system 117 assumes the role of a server to the adapter 120 role of a client. To the computer system 110, the adapters appear to be applications. The computer system supports the information management system and adapters in this client/server relationship, and also supports the interprocess transport mechanism 122 and maintains the needed data structures for operation of the transaction processing system.

Figure 3:
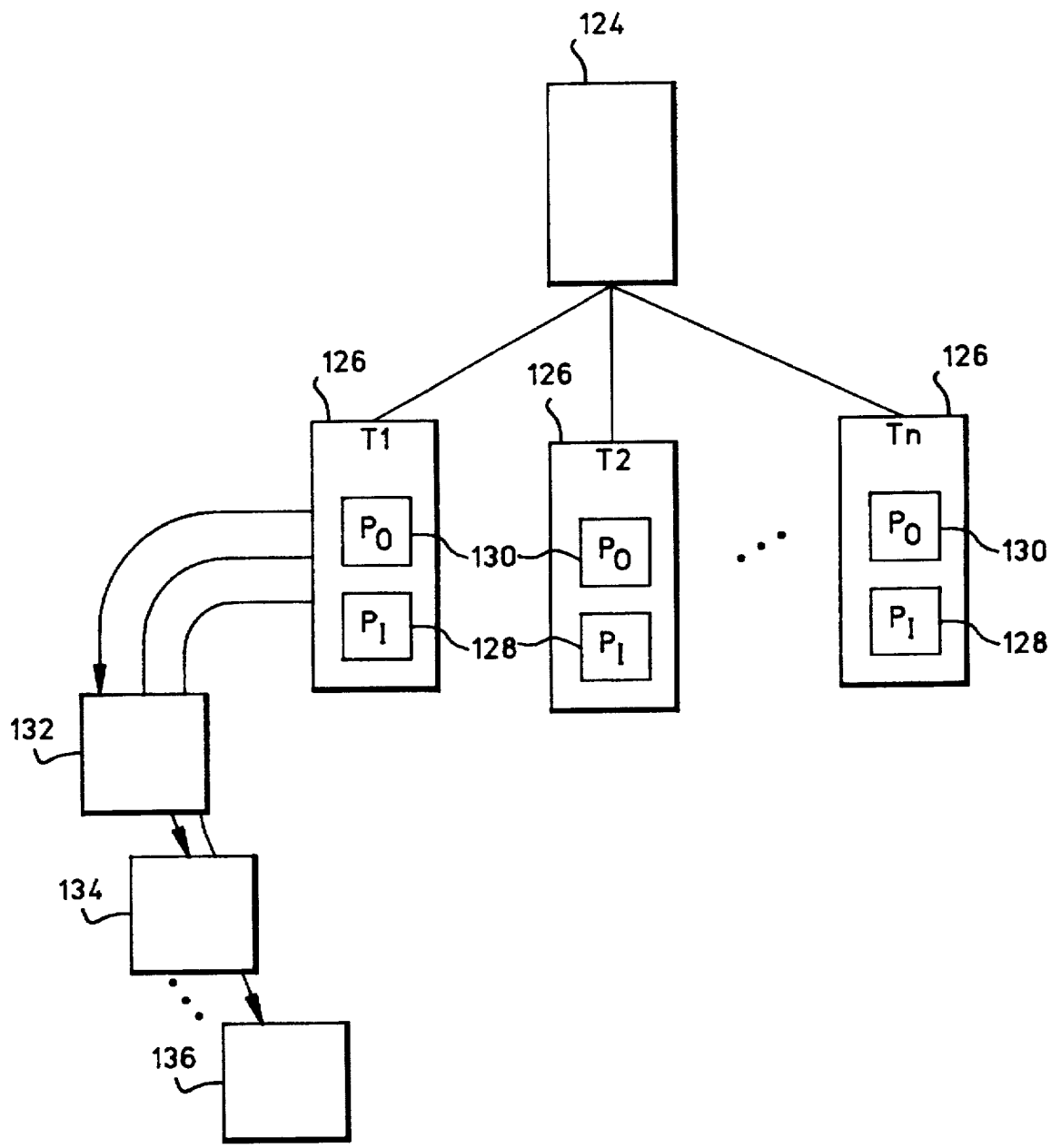
FIG. 3 is a representation of the data structures created within the host computer of the transaction processing system illustrated in FIG. 2.

In the preferred embodiment, the open transaction manager 124 creates data structures within the host computer 112 that permit such two-way communication. As illustrated in FIG. 3, such structures are referred to as transaction pipes 126. The transaction pipes include an input process 128 and an output process 130. The open transaction manager also creates data structures called transaction processes 132, 134, . . . , 136 that are associated with each transaction pipe, as indicated by the arrows connecting the transaction processes with the T1 transaction pipe. In FIG. 3, transaction processes are shown only for the transaction pipe labeled T1, but it is to be understood that each transaction pipe includes one or more transaction processes. Those skilled in the art will be aware that the data structures reside in relatively high speed, random access memory of the host computer 112.

The transaction pipes 126 are created dynamically by the open transaction manager 124 during an initialization routine when the open transaction manager receives the transaction request messages. The transaction processes 128, 130 are created by the open transaction manager as needed for each transaction received from a user terminal 114, provided the transaction request is associated with the name of a transaction pipe 126. After a particular user transaction response is returned to a user terminal, the associated transaction process is deleted from the host computer 112. In this way, the host computer does not become heavily laden with the transaction process data structures.

Thus, rather than maintain various information management system session control blocks associated with each session participated in by each one of the user terminals, the transaction processing system in accordance with the present invention dynamically maintains transaction process data structures only for the duration of a transaction. This reduces the amount of overhead that must be supported and the volume of data structures that must be maintained by the host computer.

Figure 4:
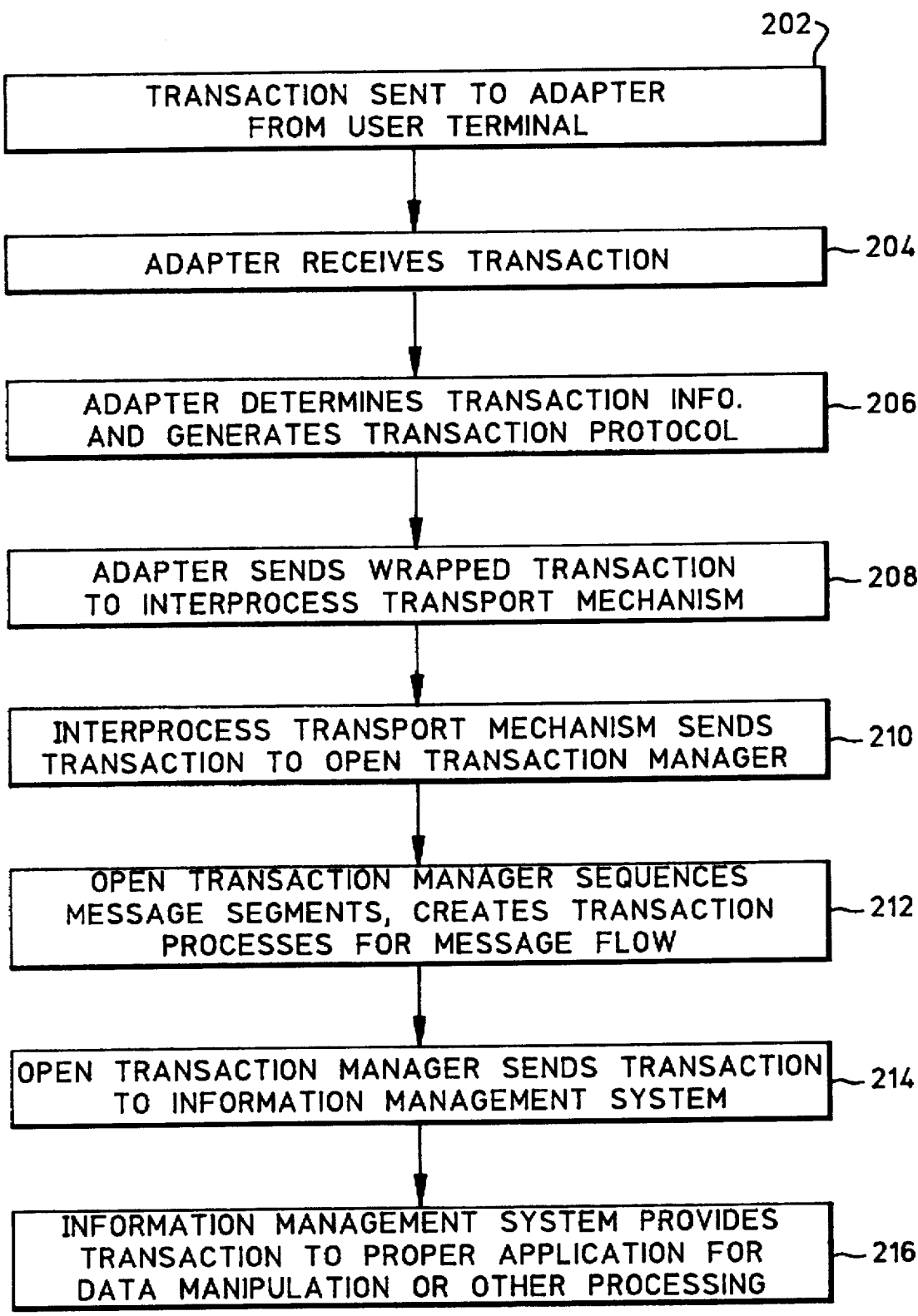
FIG. 4 is a flow diagram of the transaction processing within the host computer illustrated in FIG. 2

FIG. 4 is a flow diagram that illustrates the transaction processing within the computer system of FIG. 2 for messages received from the user terminals. As illustrated, processing begins at the first diagram block 202 when a user terminal creates a transaction message and sends it to a client process, also referred to above as an adapter. As described above, the transaction includes message information that identifies a transaction pipe in the host computer to be used for receiving the transaction and sending a transaction response. If the transaction pipe cannot be located, then the adapter causes the open transaction manager to create the necessary data structures in accordance with the information management system.

For example, in the case of the preferred embodiment with the IBM Corporation "IMS" system communicating through the "XCF" interprocess pipe is created within the "IMS" system.

Those skilled in the art will recognize that prior to communication via the "XCF" system, a process must "join" an "XCF" group and also will recognize that the "XCF" system will maintain a list of group members. Thus, either an adapter or the information management system itself will create, or define, the group to which the remaining adapters and/or information management system will join.

At the next diagram block 204, the adapter receives the transaction and recognizes the communication protocol of the user terminal. Next, at the next diagram block 206, the adapter isolates the transaction message information and generates the IMS transaction protocol that will specify, among others, the transaction name identified by the user terminal, and uniquely identify the transaction. The unique transaction identifier can comprise, for example, a transaction token that remains with the transaction as it is passed from an adapter to the interprocess transport mechanism and on to the information management system. Isolating the transaction message information comprises the adapter inquiring as to the transaction attributes, which is accomplished in the preferred embodiment by determining data fields that specify these attributes, as described in greater detail below.

After the adapter has generated the proper transaction protocol, the step illustrated at the next diagram block 208 is for the adapter to send the transaction to the interprocess transport mechanism. This is done after the adapter wraps the transaction message information in appropriate header and trailer blocks so the reconstituted transaction will be understood by the information management system and open transaction manager. The next diagram block 210 illustrates that the next step is for the interprocess transport mechanism to provide the transaction message information to the open transaction manager. As noted above, the communication to and from the interprocess transport mechanism can take place in a full duplex, relatively high-speed mode. The next diagram block 212 illustrates that the next step is for the open transaction manager to receive the transaction and create a transaction process for the transaction that is associated with the transaction pipe specified by the transaction message information and to determine if the transaction includes multiple message segments. If multiple message segments are present, then the open transaction manager properly sequences them and reconstructs the original transaction information.

Finally, the flow diagram block 214 illustrates that the open transaction manager sends the transaction on to the information management system transaction manager for processing and, at the flow diagram block numbered 216, the transaction is passed on to the appropriate application running in the host computer. This completes the processing of a transaction coming into the transaction processing system from a user terminal.

Figure 5:
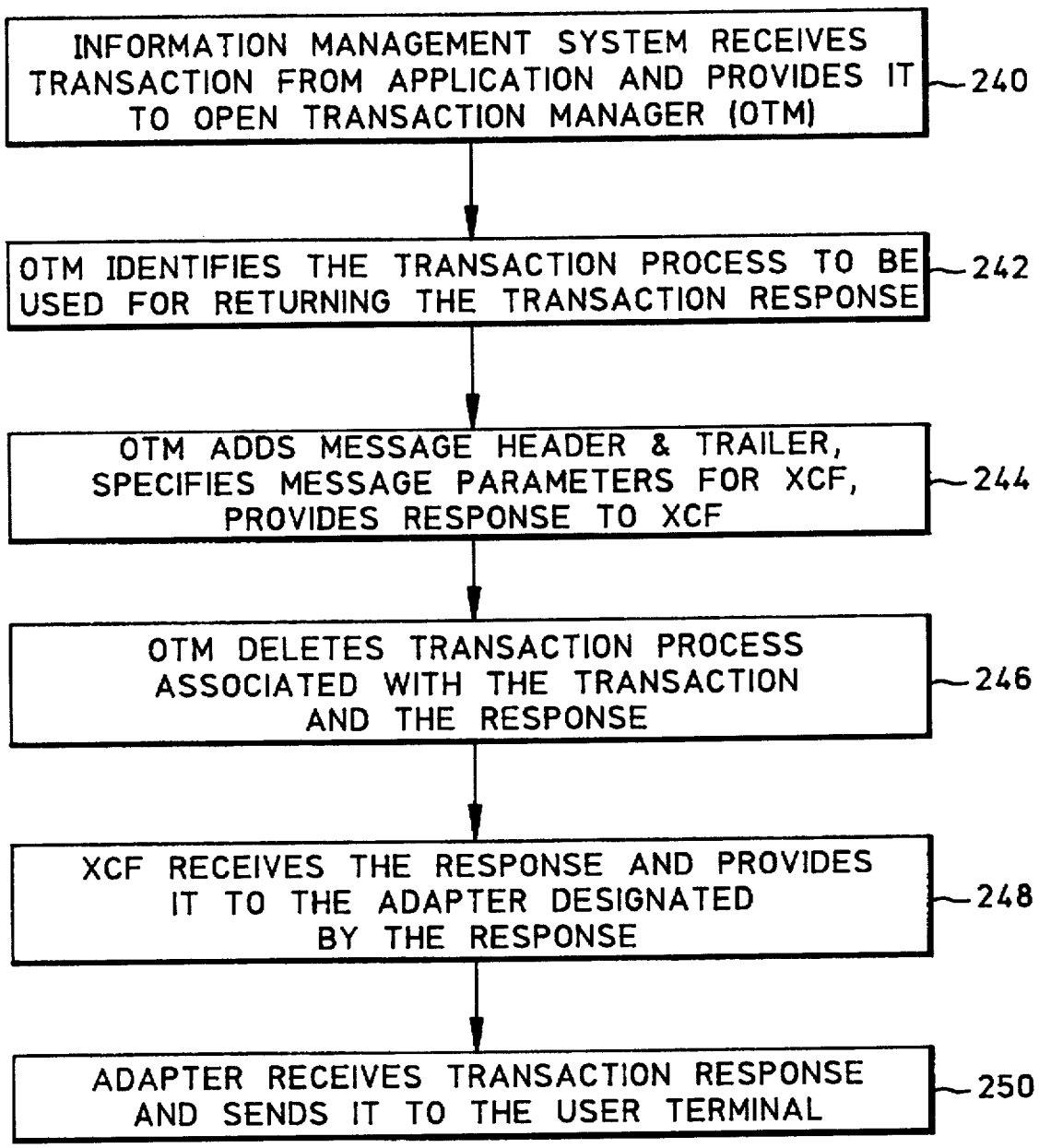
FIG. 5 is a flow diagram of the transaction response processing within the host computer illustrated in FIG. 2.

FIG. 5 is a flow diagram that illustrates the transaction output processing within the computer system of FIG. 2. As illustrated, output processing begins at the first diagram block numbered 240 when the information management system receives a response from an application after providing the application with the transaction message. The next processing step, illustrated in flow diagram block 242, is for the open transaction manager to identify the transaction process it created to be used for returning the transaction output to the proper user terminal. The next step is illustrated by the diagram box numbered 244, which indicates that the open transaction manager next adds message header and trailer information and specifies message processing parameters that are required by the interprocess transport mechanism for proper communication.

As indicated by the flow diagram box numbered 246, the next step in the transaction output processing is for the open transaction manager to delete the data structure comprising the transaction process associated with the transaction and the transaction output. This reduces the amount of overhead and reduces the number of data structures maintained within the computer system, making room for the next transaction process to be created for a subsequent transaction. The next flow diagram box 248 indicates that the next step is for the interprocess transport mechanism to receive the transaction output and provide it to the adapter designated by the output, as added by the open transaction manager. Finally, at the step numbered 250, the adapter receives the transaction output and sends it to the user terminal specified by the transaction output, again, as added by the open transaction manager in the form of header and trailer information.

As was noted above, the adapters and the open transaction manager add certain information to transactions as they are received from user terminals and make their way through the computer system, including certain data comprising the transaction protocol used by the information management system. A description of the protocol recognized by the open transaction manager in the preferred embodiment illustrates the type of transaction processing that can be achieved in a system constructed in accordance with the present invention. FIGS. 6 through 10 illustrate these protocols and the information they provide. It is to be understood, however, that such information and their arrangement is for purposes of illustration only. For example, some of the data fields described in the protocol are set by the information management system. Those skilled in the art will recognize that such data fields will differ depending on the particular information management system being used.

Figure 6:
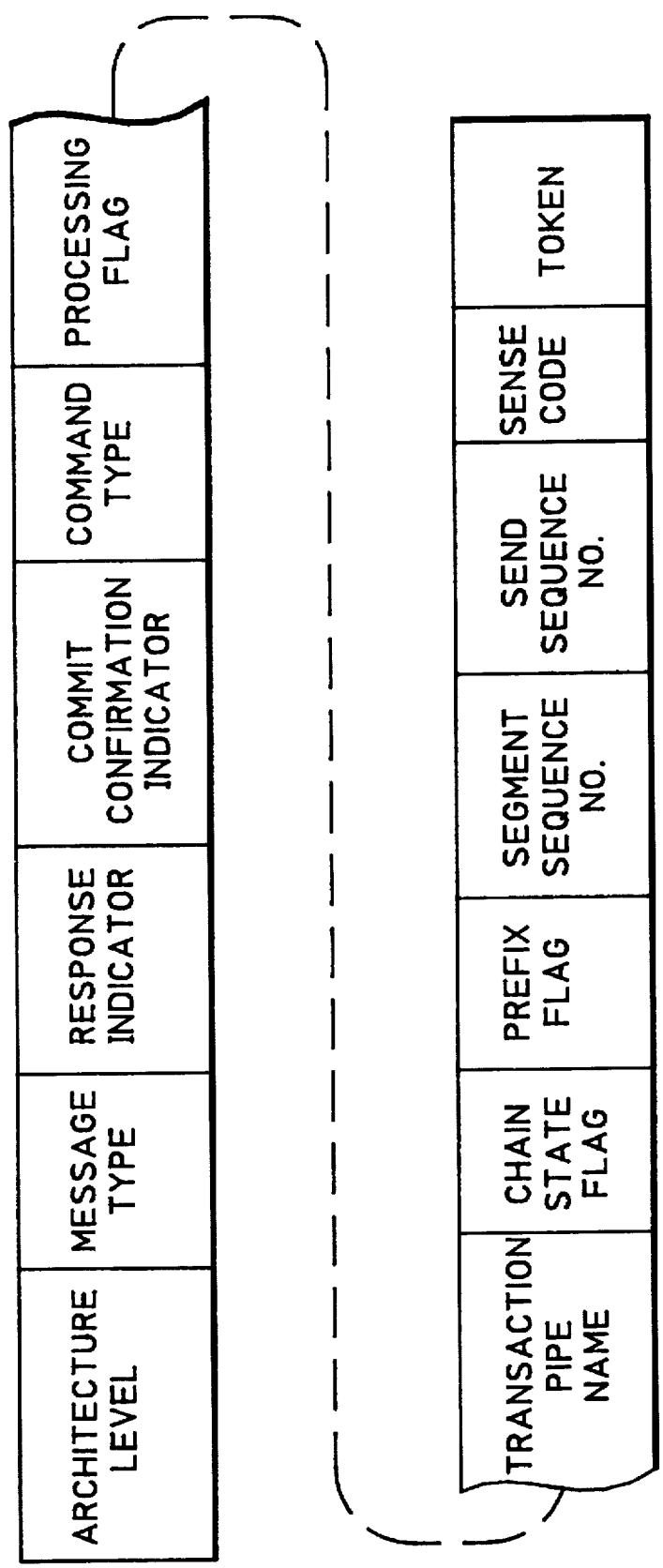
FIG. 6 is a representation of the transaction message control information of the transaction protocol used by the transaction processing system illustrated in FIG. 2.

FIG. 6 is a representation that illustrates message control information that accompanies every transaction received by the host computer. In the preferred embodiment, the message control information comprises a thirty-two byte length of data, as follows. The first byte is an architecture level data field that permits the transaction processing system to determine what level, or edition, of the transaction processing system is being used and thereby determine what features will be supported. The next byte specifies message type and can assume a value that indicates either a data message, transaction message, response message, command message, or a commit confirmation message. A data message indicates a transaction output from an application. The response field indicates when a response, or acknowledgment, to the transaction is requested before the next transaction will be accepted. The next data field is for the response indicator, which indicates whether the acknowledgement is a positive acknowledgment, or a negative acknowledgment, or a request for an acknowledgment. The next data field is for a commit confirmation indicator, which will indicate whether the transaction committed successfully or aborted.

The next data field is to indicate command type. The various command types supported by the transaction processing system in accordance with the present invention provide a great deal of flexibility. The command type can be used to request, for example, particular information management system processing or can be used to control various aspects of the transaction processing system. A client-bid command type, for example, is used in conjunction with a response-request flag to initiate communication with the information management system via the interprocess transport mechanism. A server-available command type is a response sent to a client by the information management system to confirm communications that can then follow.

Another type of command type supported by the illustrated system is for suspending input for all transaction pipes. In this way, an adapter or the information management system itself can specify when input will not be routed to any transaction pipes. A resume input command type permits all transaction pipes to again receive input. Another command type permits input to be suspended for a particular identified transaction pipe and yet another command type permits input to be resumed for a particular identified transaction pipe. These command types provide a throttling mechanism with which a user (as well as the information management system itself) can control the flow of information and transactions through the information management system, simply by providing appropriate transaction message information.

Other command types include a resynchronization command for resynchronization between an adapter and the information management system, a command to cancel a message chain in progress, to discard output from an identified transaction pipe, and to request a context identification token. The token request command type permits an adapter to request a transaction token prior to actually sending a transaction to the information management system.

The next data field of the message control information illustrated in FIG. 6 is for a processing flag, which is used to specify whether a transaction pipe being used is to be operated in a synchronized mode and/or is used to indicate that the transaction contains the name of an application. The next data field is for a transaction pipe name, which is used in all transaction processing and transaction response processing. The next data field contains a chain-state flag, which is used in transaction segment splitting. This indicates whether the accompanying message comprising message segments split over many transaction messages occurs at the beginning of the segment chain, middle of the chain, or end of the chain. The next data field is for a prefix flag, which indicates which prefixes are attached to the message. The prefixes can comprise, for example, state data, security data, user data, or application dam, or any combination thereof.

The next data field illustrated in FIG. 6 is for the segment sequence number, which is used to sequentially number message segments. The next data field contains a request for sending the sequence number as a response and is used, for example, in resynchronization operations. The next data field is for a sense code, which accompanies only a negative acknowledgment message and is otherwise unused. Finally, the last field in the message control information is for a transaction token, if tokens are used in the supporting information management system.

Figure 7:
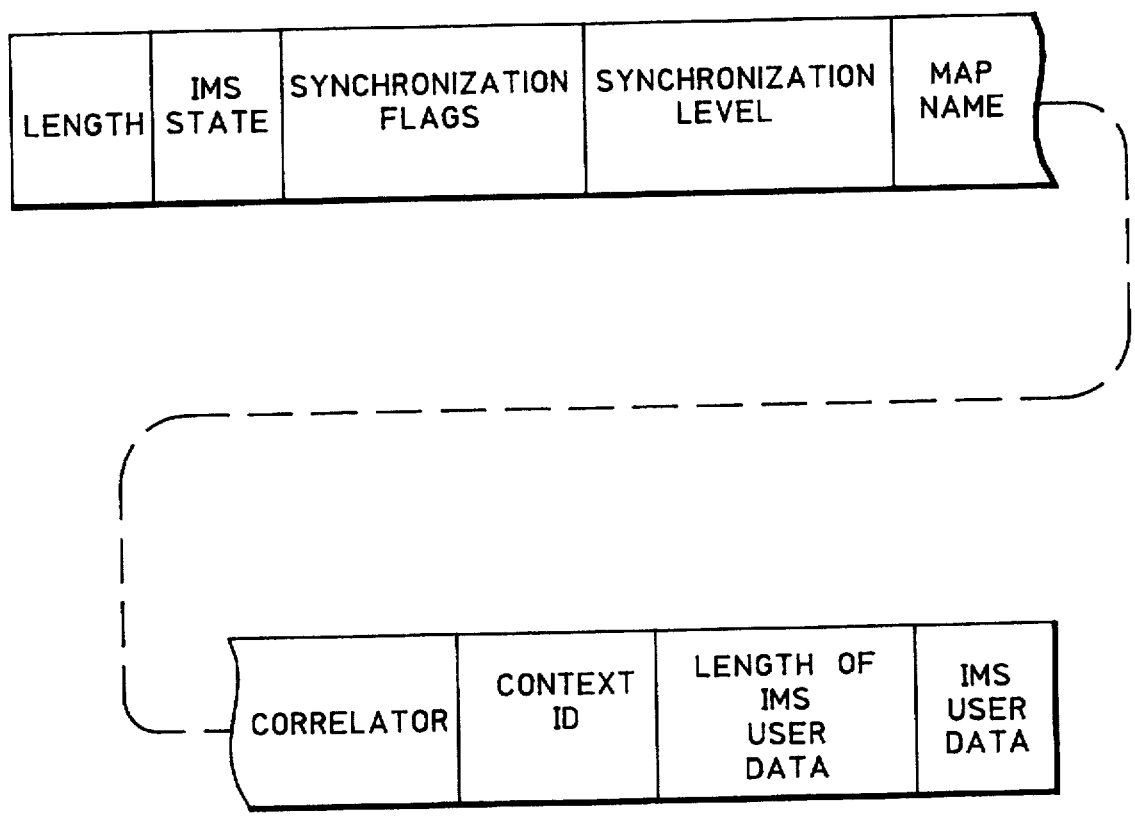
FIG. 7 is a representation of the transaction state data of the transaction protocol used by the transaction processing system illustrated in FIG. 2.

FIG. 7 and FIG. 8 are representations that illustrate state data for transactions. The particular state data actually accompanying a transaction depends on the message being sent. For messages other than command messages, the FIG. 7 data is sent. In such a case, the state data represents the first section of the message prefix.

As illustrated in FIG. 7, the first state data field comprises the length of the state data field itself. As noted above, in the preferred embodiment the information management system comprises the IBM Corporation IMS product. The next data field specifies the IMS state, which is either a conversational state or a response mode. These states are set by the IMS system and will be known to those skilled in the art. The next state data field comprises synchronization flags. These flags set either a forced response that guarantees a transaction output, even if the transaction ends without sending output data, a "commit mode zero" that commits output before sending it, a "commit mode one" that sends output before committing it, or a notify transfer mode that ensures user notification if a context token identification is transferred by the information management system.

The next data field specifies the synchronization level, which can be set to either none, confirm, or commit. The next data field, which is for map name, refers to mapping options available to users of the IBM Corporation IMS product. The next data field illustrated in FIG. 7 is for correlator data and refers to a token that correlates input transactions with transaction output, or responses. This field is for the open transaction manager to use in pairing up transaction responses with transactions, in a manner known to those skilled in the art. The next data field is for a context token identification that is used by the IMS system for managing a unit of work. The last two data fields refer to the length of the user data field and to the user data itself.

FIG. 8 is a representation of the state data for command messages only. The first data field contains the length of the state data field, including the length field. The next data field refers to the server, or open transaction manager, identification name for use by the interprocess transport mechanism. The next data field is for a token of the transaction message originator and the last data field is for a token representing the message destination.

Figure 9:
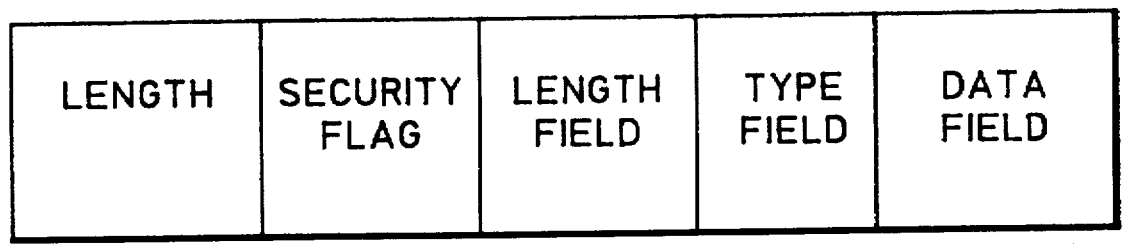
FIG. 9 is a representation of the security data of the transaction protocol used by the transaction processing system illustrated in FIG. 2.

FIG. 9 is a representation of security data information and illustrates novel security features provided by the transaction processing system constructed in accordance with the present invention. The first security data field is the length of the information, including the length field itself. The next data field is for a security flag, which can be set to indicate to the information management system that the user terminal has already gone through security verification procedures at the adapter level and which do not have to be repeated. In general, transaction protocols require security to be verified immediately before access to the information management system is granted. In accordance with the present invention, then, the adapters can perform security verification duties and therefore can eliminate duplicative security processing with the security flag data field. This can greatly reduce the amount of processing overhead.

The next three user identification data fields may appear in any order or may be omitted. These fields specify field type, the user identification field length, and the user identification data field. The data field is for the user identification itself, then the password length, the password type, the password itself, the security profile length not including the length field itself, the profile type, and the profile itself. The next two data fields, for RACF group length and RACF group itself, relate to IBM Corporation product features only.

Figure 10:
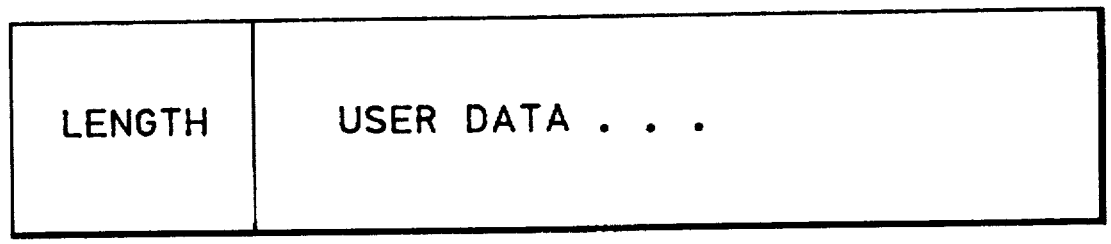
FIG. 10 is a representation of the user data of the transaction protocol used by the transaction processing system illustrated in FIG. 2.

FIG. 10 is a representation of the user data information. This data comprises only two data fields, a length field that specifies the length of the user data section, including the length field itself, and a user data field that can be optionally inserted by a user terminal and will be returned unchanged from the IMS system in the first segment of any transaction response message.

Figure 11:
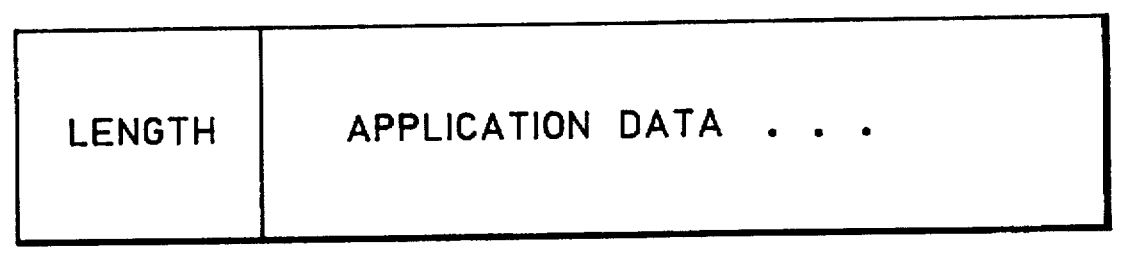

FIG. 11 is a representation of the application data section. This data section also comprises only two data fields. The first field is a length field that specifies the length of the application data section, including the length field itself. The second data field is the application data, or transaction output data. The application name is contained in the first bytes of the application data.

Thus, as described above, a computer system that has a host computer running applications and user terminals connected to the host computer and also includes a transaction processing system constructed in accordance with the present invention determines transaction attributes for each transaction received by the host computer and dynamically associates a transaction protocol to be used in processing that transaction. The transaction protocol specifies such attributes as synchronization paradigm and flow control. The synchronization paradigm and flow control are used only for as long as the transaction remains in the system and are used only for that transaction. A user can thereby dynamically specify how each transaction will be processed, independently of the manner in which other transactions are processed, and can enjoy greater flexibility in transaction processing. In addition, transaction processing systems can more easily accommodate new protocols and new processing features desired by users.

Those skilled in the art will appreciate that changes and modifications to the preferred embodiment described above can be implemented without departing from the teachings of the present invention. For example, the transaction pipe data structures as described are not necessary; there simply must be a process for directing transactions and transaction output. Similarly, the specific interprocess transport mechanism described with respect to FIG. 2 can be replaced with alternate mechanisms that provide the high-speed, two-way communication described.

In terms of the OSI reference model referred to above and known to those skilled in the art, the present invention treats transactions as data objects that have attributes independent of any application, session, or transport layer considerations. As such, the invention can be implemented as a unique, transaction-specific reference model layer that is independent of the other layers. Thus, the protocol described above is not specific to any application being served. This frees the client processes, or adapters, from being burdened with application-related issues when submitting transactions and receiving transaction output. The invention thus provides a client/server protocol that dynamically binds transaction processing attributes, including flow control and synchronization paradigm, to each transaction.

The present invention has been described above in terms of a presently preferred embodiment so that an understanding of the present invention can be conveyed. There are, however, many configurations for computer transaction processing systems not specifically described herein but with which the present invention is applicable. The present invention should therefore not be seen as limited to the particular embodiment described herein, but rather, it should be understood that the present invention has wide applicability with respect to computer transaction processing systems generally. All modifications, variations, or equivalent arrangements that are within the scope of the attached claims therefore should be considered as being within the scope of the invention.

We claim:

1. In a computer transaction processing system having a host computer and at least one user terminal connected to the host computer:

at least one adapter that dynamically receives transaction attributes of transactions comprising messages to be sent from one or more of the user terminals to one or more applications executing in the host computer of computer transaction processing system during a communication session between the host computer and the user terminal;

means for specifying a transaction protocol for each one of a plurality of received transactions, independently of any predefined communications protocol, based on the transaction attributes received in each transaction;

means for dynamically binding said transaction protocol to said one transaction; and means for dynamically unbinding said transaction protocol after said one transaction is completed.

2. A computer transaction processing system as defined in claim 1, wherein the adapter further includes a plurality of client processes that receive transactions from one or more user terminals and that direct the flow of transaction responses.

3. A computer transaction processing system as defined in claim 2, wherein:

the means for dynamically binding the transaction protocol comprises an open transaction manager that creates a data structure for each transaction that controls the flow of the transaction within the transaction processing system.

4. A computer transaction processing system as defined in claim 3, wherein the open transaction manager specifies a synchronization paradigm and flow control associated with each transaction based on the transaction attributes received by the adapter.

5. A method for establishing a protocol in a transaction processing system having a host computer, to which are connected one or more user terminals, said method comprising:

inquiring of an application, in said transaction processing system, the attributes of a transaction comprising a message to be sent from one or more of the user terminals to one or more applications executing in the host computer during a communication session between the host computer and the user terminal; and specifying, based on said received transaction attributes, for each one of a plurality of transactions independently of a predefined communication protocol, a transaction protocol comprising a synchronization paradigm and a flow control;

whereby said transaction protocol is dynamically bound to the transaction and the transaction protocol processing is unbound after said transaction ends.

6. A method as defined in claim 5, wherein the step of inquiring comprises reading data fields of the transaction, said data fields specifying the transaction attributes.

7. A method as defined in claim 6, wherein the step of specifying further includes determining if a security verification step has been performed and is not to be repeated.

8. A method as defined in claim 6, wherein the step of specifying further includes determining if no more transactions should be accepted from one or more users.

9. A method as defined in claim 8, wherein the step of specifying further includes determining if additional transactions should be accepted from one or more users.

10. A method as defined in claim 6, wherein the step of specifying comprises creating a data structure that determines the synchronization paradigm and flow control to be used in processing the transaction.

11. A method as defined in claim 10, wherein the step of specifying further comprises deleting the data structure after the transaction ends.

12. In a transaction processing system having a host computer:

transport means the receiving a plurality of transactions, each having protocol-specifying transaction attribute, from one or more transaction processing system users communicating with the host computer and for sending a plurality of transaction responses to one or more of the system users;

process means for receiving the transactions from the transport means and determining a transaction protocol for each received transaction, in accordance with the transaction attributes received with each respective transaction, each transaction protocol including a plurality of protocol data fields specifying a synchronization paradigm and transaction flow control, and for determining a user destination for each transaction output; and presentation means for associating the determined synchronization paradigm and transaction flow with each received transaction to permit a transaction to be directed to an application connected to the presentation means in the synchronization paradigm specified and for ending the association after a transaction response has been returned to the process means.

13. A transaction processing system as defined in claim 12, wherein: the system users comprise computer terminals connected to the system; and the transport means includes interprocess transfer means for providing full duplex communication between the user terminals and the process means.

14. A transaction processing system as defined in claim 13, wherein the interprocess transfer means maintains a group list of members for which the interprocess means will send and receive transactions and transaction responses.

15. A transaction processing system as defined in claim 13, wherein the transport means further includes a plurality of protocol adapters to which the user terminals direct the transactions and from which the users receive transaction responses.

16. A transaction processing system as defined in claim 15, wherein each adapter must join the group of interprocess transfer means members before it can send transactions to the process means.

17. A transaction processing system as defined in claim 16, wherein each user transaction specifies a transport protocol adapter through which the transaction will be sent to the processing means and from which the sending user will receive the transaction response.

18. A transaction processing system as defined in claim 17, wherein each adapter receives transactions according to a first predefined protocol selected by the user and produces an adapter transaction output according to a second transaction manager protocol.

19. A transaction processing system as defined in claim 18, wherein each transaction includes data that specifies an adapter with which the transaction will be associated.

20. A transaction processing system adapted for use with a computer system having user terminals linked to a host computer supporting an information management system that receives transaction from the user terminals, communicates with applications being executed in the host computer, and provides transaction responses to the user terminals, the transaction processing system comprising:

transport means for receiving a plurality of transactions from the system user terminals and providing the transactions to the host computer, and for sending a plurality of transaction responses from the host computer to one or more of the user terminals;

process means for determining a transaction protocol for each received transaction according to transaction attributes of each respective received transaction, each transaction protocol including a plurality of protocol data fields specifying a synchronization paradigm and transaction flow control, and for determining a destination user terminal for each transaction output;

coupling means for receiving a plurality of transactions from the user terminals and providing the plurality of transactions to the process means in a full duplex mode; and presentation means for associating the determined synchronization and transaction flow with each received transaction to permit a transaction to be directed to an application connected to the presentation means and for ending the association after a transaction response has been returned to the process means.

21. A transaction processing system as defined in claim 20, wherein the process means includes a memory area for storing information and creates a transaction process data structure in the memory area for each new transaction received from the coupling means, in which the process means stores the transaction until it is sent to the information management system and in which the process means places an associated transaction response received back from the information management system until the output transaction is sent to the coupling means, and then deletes the transaction process from the memory area.

* * * * *